Feb. 7, 1950  G. SHOCKEY  2,497,019
AUTOGRAPH SCROLL
Filed May 7, 1945  2 Sheets-Sheet 1
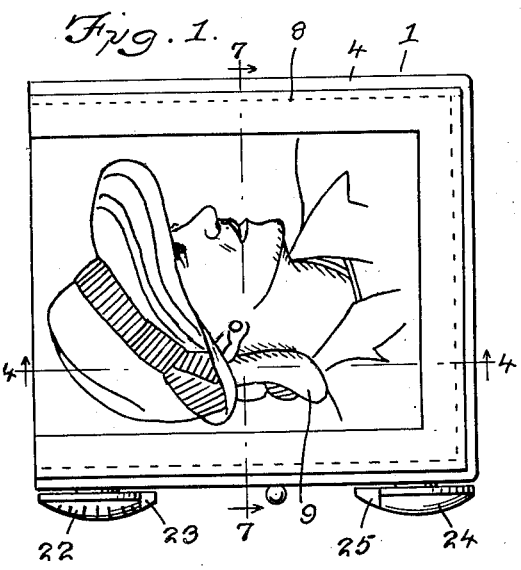
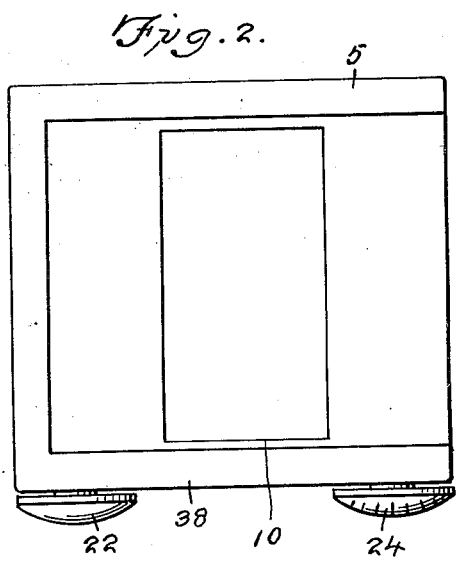
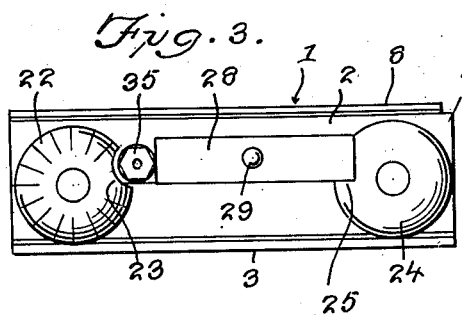
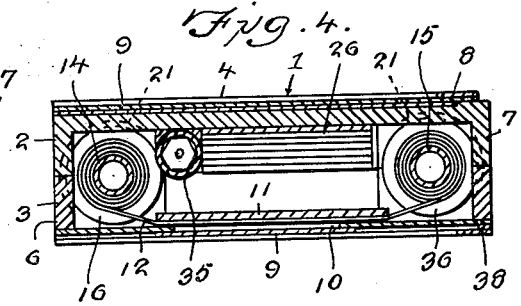
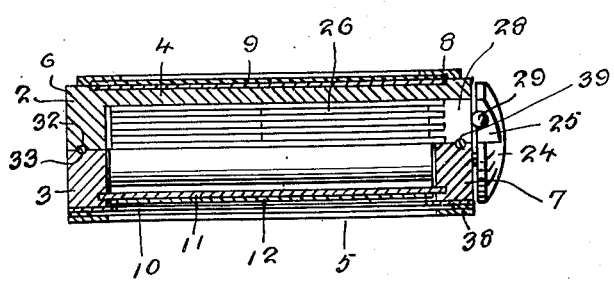
INVENTOR.
Glen Shockey
BY Victor J. Evans & Co.
ATTORNEYS Feb. 7, 1950
G. SHOCKEY
2,497,019
AUTOGRAPH SCROLL
Filed May 7, 1945
2 Sheets-Sheet 2
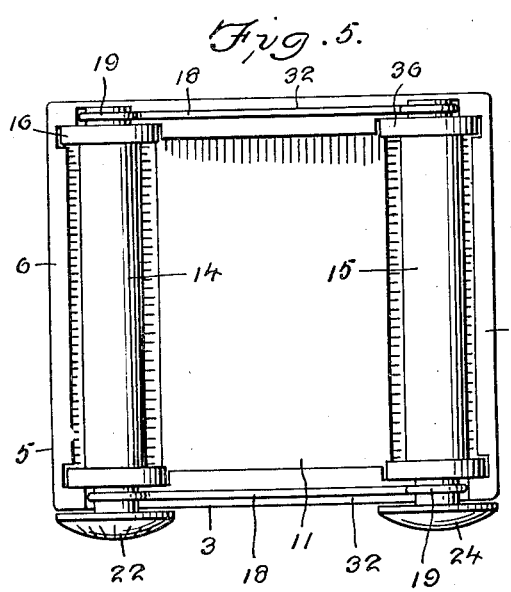
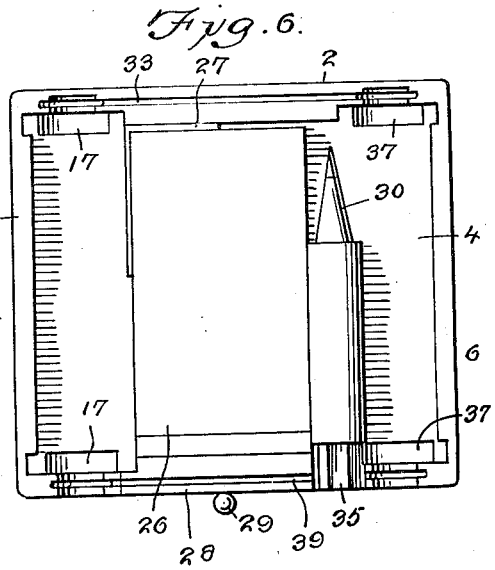
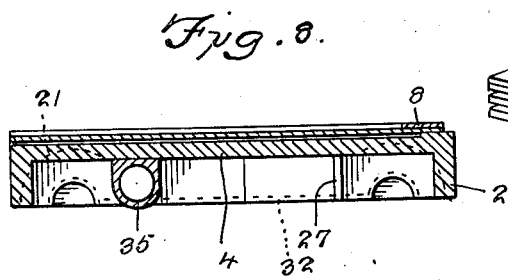
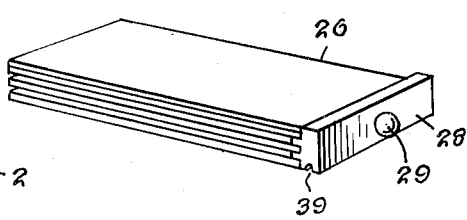
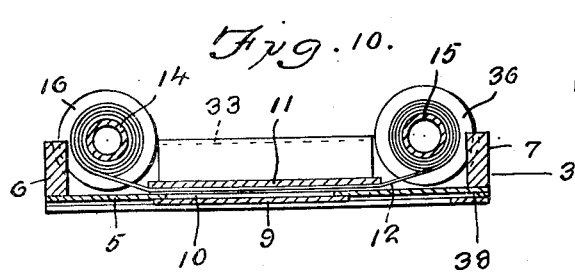
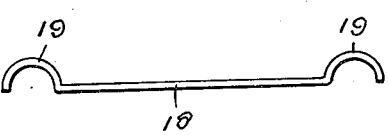
INVENTOR.
Glen Shockey
BY Victor J. Evans & Co.
ATTORNEYS Patented Feb. 7, 1950

2,497,019

UNITED STATES PATENT OFFICE 2,497,019

AUTOGRAPH SCROLL

Glen Shockey, Chicago, Ill.

Application May 7, 1945, Serial No. 592,503

1 Claim. (Cl. 40—86)

My present invention, in its broad aspect, has reference to improvements in unitary devices having spools on which are wound an autograph paper strip which may be so made as to display pictures or photographs with the autographs, and which may be wound back to review autographs and pictures, and has a drawer for pictures, a pencil holder, an improved casing, and improved turning buttons or knobs for the spools formed with means for locking and releasing the pencil and photograph drawer. Furthermore, I provide a casing having means on one side through which a photograph may be displayed and on the other a window with a support beneath for taking or displaying autographs, and the casing having space within its walls for the spools, the pencil and the photograph drawer.

Other and equally important objects and advantages of my invention will be apparent from the following description and drawings, and it is pointed out that changes in form, size, shape, materials, and construction and arrangement of parts is permissible and within the purview of my broad inventive concept, and the scope of the appended claim.

In the drawings wherein I have illustrated a preferred form of my invention—

Figure 1 is a top plan view of the device with the parts assembled.

Figure 2 is a bottom plan view showing the window for autographs and the like;

Figure 3 is a side view showing the spool operating knobs or buttons in interlocking position with respect to the pencil and photograph drawer;

Figure 4 is a section on the line 4—4 of Figure 1;

Figure 5 is a top plan interior view of the casing (which is formed with a top and a bottom section) showing the spools in the bottom section with the upper section removed;

Figure 6 is a bottom plan interior view of the upper section of the casing showing the pencil;

Figure 7 is a section on the line 7—7 of Figure 1;

Figure 8 is a section also taken on line 4—4 of Figure 1 with the lower section of the casing omitted;

Figure 9 is a perspective view of the photograph drawer per se;

Figure 10 is a section also taken on line 4—4 of Figure 1 with the upper section of the casing omitted;

Figure 11 is a detail of the wire clips to hold the spools in place.

In the drawings wherein like characters of reference are used to designate like or similar parts throughout the several views:

The numeral 1 designates my hollow rectangular casing which is formed with upper and lower sections 2 and 3, and which has top, bottom, side and end walls, respectively 4, 5, 6 and 7. The casing may be formed of any suitable material, plastic, metal or otherwise. The top section 2 of the casing has a raised border 8 around three edges within which a photograph 9 may be displayed and the lower section 3 is provided with a similar border or photograph holding channel 38 and a transparent sheet 9, which covers a window 10, is freely positioned in the channel of the border. The bottom section 3 of the casing in which the window 10 is positioned has a support or table 11 over which is trained the autograph strip 12. The autograph strip 12 is wound on spools 14 and 15 whose hubs 16 and 36 are journalled in bearing recesses 17 and 37 in the side walls 6. The edges of the side walls of the upper section are provided with grooves 32 and similar grooves 33 are provided in the edges of the side walls of the lower section. The grooves receive the wire spool holders 18—as shown in Figure 11—which have semi-circularly bent ends 19 to go over the hubs and a straight connecting length connecting the ends. The ends of the spools bear against the side walls, and arcuate recesses 21 as shown in dotted lines in Figure 4 may be formed in the top and ends to accommodate the same if desired. On the end of the spool 14 the knob 22 has a notch 23 therein, and on the spool 15 is a knob 24 which is provided with a notch 25. The notch 23 of the knob 22 is positioned to register with a cylindrical pencil supporting case 35 within the casing, and the notch 25 with the corner of a photograph drawer 26 also mounted in the casing. The pencil case is fixed to the top 4 of the upper section 2 side-by-side with the drawer 26 which is slidably engaged with the L-shaped guide 27 and has a front face 28 with a knob 29 to draw the drawer out through the side wall, if desired. The lower edge of the front 28 of the drawer is provided with a notch 39 to receive the spring wire 18. Turning of the knobs or spools brings the notches 23 and 25 out of registry and holds the pencil 30 and drawer 26 in place. I have thus provided an improved compact and unitary device which may be readily carried about and exhibited or used for the purpose of storing photographs and taking autographs.

From the foregoing, it is believed that the operation and advantages of my invention will be apparent, but it is again emphasized that interpretation of its scope should only be conclusive when made in the light of the subjoined claim.

I claim:

A unitary device for winding autograph and photograph strips and displaying the same, comprising a sectional casing, between the section of which strip winding spools are supported, hubs on the spools, bent wire holding devices engaging over the hubs to hold the spools in place, knobs on the spools for turning the same, each of said knobs being provided with an edge notch, the casing having a window to expose the strip, a table under the window, a pencil in the casing, a photograph drawer slidably mounted in the casing, and the knobs overlapping the pencil and drawer and adapted to be moved to register the notches therewith to withdraw the pencil and drawer.

GLEN SHOCKEY.

REFERENCES CITED

The following references are of record in the file of this patent:

UNITED STATES PATENTS

| Number | Name | Date |
|---|---|---|
| 158,876 | Whitney | Jan. 19, 1875 |
| 276,516 | Whitney | Apr. 24, 1883 |
| 582,836 | Upham | May 18, 1897 |
| 824,266 | Todd | June 26, 1906 |
| 1,517,605 | Warren | Dec. 2, 1924 |
| 1,767,924 | Greene | June 24, 1930 |